United States Patent
Gordon

(10) Patent No.: US 7,227,975 B2
(45) Date of Patent: Jun. 5, 2007

(54) SYSTEM AND METHOD FOR ANALYZING AERIAL PHOTOS

(75) Inventor: Goren Gordon, Rishon Le-Zion (IL)

(73) Assignee: Gordonomics Ltd., Herzelia Pituah (IL)

( * ) Notice: Subject to any disclaimer, the term of this patent is extended or adjusted under 35 U.S.C. 154(b) by 474 days.

(21) Appl. No.: 10/152,309

(22) Filed: May 20, 2002

(65) Prior Publication Data
US 2003/0095684 A1 May 22, 2003

(30) Foreign Application Priority Data
Nov. 20, 2001 (IL) .................................. 146597
Nov. 21, 2001 (WO) ..................... PCT/IL01/01074

(51) Int. Cl.
*G06K 9/00* (2006.01)
*G06K 9/34* (2006.01)
*G06K 9/36* (2006.01)

(52) U.S. Cl. .................. 382/103; 382/171; 382/282

(58) Field of Classification Search ............... 382/162, 382/100, 154, 103, 171, 282
See application file for complete search history.

(56) References Cited

U.S. PATENT DOCUMENTS

| | | | | |
|---|---|---|---|---|
| 6,430,309 B1 * | 8/2002 | Pressman et al. | ........... | 382/133 |
| 6,473,516 B1 * | 10/2002 | Kawaguchi et al. | ........ | 382/100 |
| 6,539,330 B2 * | 3/2003 | Wakashiro | .................. | 702/152 |
| 6,604,126 B2 * | 8/2003 | Neiman et al. | ............. | 709/203 |
| 6,671,422 B1 * | 12/2003 | Nakanishi | .................... | 382/291 |
| 6,735,348 B2 * | 5/2004 | Dial et al. | .................. | 382/293 |
| 6,778,702 B1 * | 8/2004 | Sweet | ......................... | 382/191 |
| 6,834,120 B1 * | 12/2004 | LeClerc et al. | ............. | 382/170 |
| 6,847,462 B1 * | 1/2005 | Kacyra et al. | .............. | 356/601 |
| 6,868,172 B2 * | 3/2005 | Boland et al. | ............. | 382/132 |
| 6,870,965 B2 * | 3/2005 | Kim et al. | ................... | 382/305 |

* cited by examiner

*Primary Examiner*—Matthew C. Bella
*Assistant Examiner*—Utpal Shah
(74) *Attorney, Agent, or Firm*—Wolf Greenfield & Sacks

(57) ABSTRACT

A system and method for analysis for analysis of aerial photos is disclosed. The method comprises receiving an aerial photo, calculating complexity values of aerial photos received, sorting the complexity values of the aerial photo, and displaying the aerial photos and analysis of the complexity values. The system comprises an input device for receiving aerial photos, a computing device for calculating complexity values of captured aerial photos, a computing device for sorting complex values of aerial photos, a storage device for storing internal database, and a comparator device.

4 Claims, 1 Drawing Sheet

SYSTEM AND METHOD FOR ANALYZING AERIAL PHOTOS

CROSS REFERENCE TO RELATED APPLICATIONS

This application claims priority from PCT application No. PCT/IL01/01074, filed Nov. 21, 2001, and Israeli Patent Application No. 146597, filed Nov. 20, 2001, each of which is hereby incorporated by reference as if fully set forth herein. PCT/IL01/01074 is currently pending as U.S. national phase filing No. 10/445,213 and has been published as U.S. Publication No. 2004/0236805.

BACKGROUND OF THE INVENTION

The present invention relates to analyzing aerial photos.

Aerial photos are photos taken from an aircraft or a satellite during a typically predominated flying route thus, providing a perspective view of a usually large area. Consequently, aerial photos provide considerable amount of information regarding the surface captured by the photograph. Aerial photos capture structural layout of the surface and objects located on the surface within the photo's frame. The photos are used for mapping areas for civil engineering matters such as planning roads, bridges and habitation locations. Other purposes can be for tracking changes over a period of time by comparing previously photographed aerial photos to current updated photograph of the same surface location. Correspondingly, aerial photos can track position of objects located on a surface and their advancement over a period of time. Hence, aerial photos are used for military surveillance of hostile objects such as vehicles, tanks, artillery guns, anti-aircraft guns and the like. The accuracy and magnitude of objects that can be detected within an aerial photo is subject to the height of the aircraft and the resolution provided by the camera. The resolution and clarity of a photo is also subject to the camera used and the clarity of the intermediate medium (e.g. air) affected by the time of day, weather, etc. as well as other environment factors.

Aerial photos are usually large and capture a large surface area and consequently a considerable amount of data. The considerable amount of data raises the problem of comprehending and processing all the said data within a reasonable period of time. Furthermore, the objects captured occasionally have low resolution and require expertise recognition for determining the character of the said object. One manner of interpreting an aerial photo is the manual way. The manual way requires expertise manpower that reviews in detail for pertinent objects within the photo's frame and reports its findings to an interested factor such as a mapping center agency, military intelligence agency, etc. The manual way is time consuming and is generally insufficient and impractical when aerial photos are large and the period of time is limited. Another way for interpreting an aerial photo is by combing the manual way with a Pattern Recognition Method (PRM). According to this way of interpreting the first stage is executing the PRM and the second stage is by executing the said manual way. The PRM is operated within computerized surrounding that has the ability to recognize the presence of an object on a photo that can be easily distinguished from its surroundings, such as a ship in the ocean or a regiment of tanks concentrated at one base in a desert and the like. The PRM operating within a computerized environment provides fragments of the aerial photo to be examined according to the manual way. The fraction received from the operation of the RPM reduces the size of the aerial photo to be examined within the next stage. Once the PRM is executed the second stage of the manual way is executed upon the received fractions. However, the combination of the PRM and manual way does not provide accurate results subject to the limitation of the PRM. The limitation of the PRM is due to the method of recognition of important objects within an aerial photo, which often ignores important objects that are not recognized, by this method.

There is therefore a need in the art for a method and system for recognizing and analyzing important objects within aerial photos providing rapid and accurate information.

SUMMARY OF THE INVENTION

A system and method for analysis for analysis of aerial photos is disclosed.

The method comprises receiving an aerial photo, calculating complexity values of aerial photos received, sorting the complexity values of the aerial photo, and displaying the aerial photos and analysis of the complexity values.

The system comprises an input device for receiving aerial photos, a computing device for calculating complexity values of captured aerial photos, a computing device for sorting complex values of aerial photos, a storage device for storing internal database, and a comparator device.

DETAILED DESCRIPTION OF PREFERRED EMBODIMENTS

Figure 1:
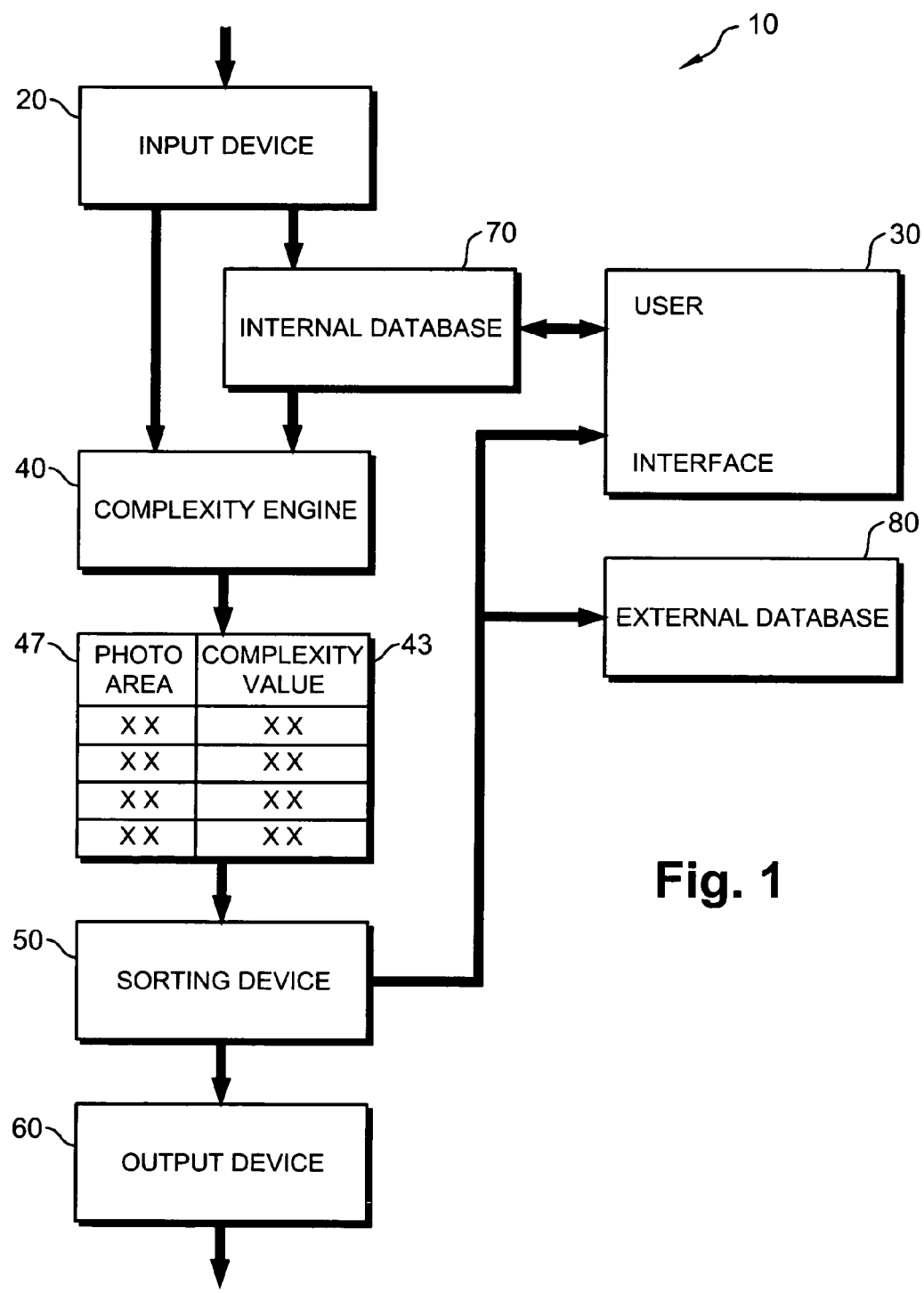
FIG. 1 illustrates a preferred embodiment of the present invention and particularly an object recognition analysis system and method for recognizing and analyzing areas containing objects generally and objects within aerial photos received by the system specifically.

The present invention provides an object recognition analysis system and method (ORAS) for recognizing and analyzing areas containing objects generally and objects within aerial photos received by the ORAS specifically. The present invention provides the use of the complexity data analysis (CDA) system and method presented within PCT Application PCT/IL01/01074, related patent application to the present invention, which is incorporated herein by reference. Thus, the ORAS provides the ability of recognition and analysis of the existence of areas with objects and objects using CDA. Furthermore the ORAS provides the ability to compare two or more aerial photos or aerial photos fragments and to analyze changes between said photos. In a further aspect of the present invention ORAS may operate in a combined manner with the PRM either for recognition and analyzing objects or for tracing changes between two or more aerial photos. The use of the CDA for recognition and analyzing of objects is performed by exploiting characteristic attribute of known objects and landscapes as viewed on an aerial photo. The complexity value of said characteristic attributes are inserted to the internal database of the ORAS providing thresh-hold values used for comparison and recognition of said objects by the CDA according to PCT Application PCT/IL01/01074. The ORAS can be directed to a particular fragment within an aerial photo and can perform a CDA for providing information, in one case, whether there was a change of complexity value of the particular section of the aerial photo in comparison to another and, in another case, to recognize and analyze existence of objects and particular objects within an aerial photo. Accordingly, the ORAS can be directed to fragments frames within an aerial photo by a user, be used as a following stage of PRM for recognition and analysis of objects within the fragments frames received from activating the PRM, or a following stage after activating any other method.

The ORAS activates complexity calculations on aerial photos or on fragments frames of aerial photos that were selected by a user, fragments received from executing PRM or any other method. After given a complexity value by the complexity engine within the ORAS (according to PCT Application PCT/IL01/01074) the complexity value is compared, if required, and sorted by the sorting device in accordance to suitable parameters received from the internal database of the ORAS. The ORAS provides recognition and analysis output of objects after the sorting device processed the complexity metric values given to objects within the fragment of the aerial photo. The ORAS will be better understood relating to FIG. 1.

FIG. 1 depicts a block diagram illustrating the GRAS, designated 10. The ORAS 10 includes an input device 20, a user interface 30, an external database 80, an output device 60, an internal database 70, a complexity engine 40 and a sorting device 50. The input device 20 is a device for capturing aerial photos. According to one preferred embodiment the input device 20 can be a scanner and the like. According to the preferred embodiment the input photo is presented to a user through the user interface 30. The user interface 30 according to the present embodiment can include a screen (not shown) and input device (not shown) such as a pointing device. The user, according to the present embodiment can indicate fragments within the said photo for recognition and analysis. Additionally, the user, within the present embodiment, can insert parameters regarding basic definitions such as what percentage of the photo to present, type of photos, etc. The parameters are inserted to the internal database 70. The internal database 70 conveys parameters, inserted by user as well as others (according to PCT Application PCT/IL01/01074), to the complexity engine 40. The complexity engine 40 activates the CDA on the previously indicated fragments frames using parameters received from the internal database 70. The complexity engine 40 computes the complexity value 43 for the photo fragment and produces a complexity metric for each photo (i.e. for every area in the photo 47 there are complexity parameters). The sorting device 50 sorts the area according to their complexity value and sends the recognized and analyzed relevant areas, within the previously indicated aerial photo fragment by the user, to the user interface 30 for display. Concurrently for receiving the recognized and analyzed relevant areas the user interface 30 receives the said aerial photo fragment. According to another embodiment the sorting device 50 can provide particular object recognition thus, presenting the user interface 30 with its analysis of the objects within the fragment. The output device 60 provides the relevant areas and the object recognition and analysis alongside with the previously indicated aerial photo fragment to the user interface. The recognition and analysis results alongside with the relevant aerial photo fragment are stored in the above embodiments within an external database 80 for further evaluation.

In another preferred embodiment the input device 20, such as a scanner, receives pairs of photos, each aerial photo photographed the same surface location but at different time. The user interface 30 according to the present embodiment includes the same elements as the first embodiment above, including a screen (not shown) and an input device (not shown) such as a pointing device. The user views the photo on the user interface 30 and indicates the relevant fragment for analysis and comparison. The user can insert parameters to the internal database 70 through the user interface 30. The parameters can be regarding basic definitions such as what percentage of the photo to present, type of photos, etc. The internal database 70 receives the parameters, and sends the complexity engine 40 the appropriate calculation parameters for activating a complexity calculation for each photo. The complexity engine 40 computes the complexity value 43 of the photos and produces a complexity metric for each photo (i.e. each area within the photo 47 has a complexity parameter). The complexity engine 40 calculates the difference between the complexity values of each area within the pair of photos, thus producing a difference complexity metric for the pair of photos. The said complexity metric of each photo along with the photo is stored within the external database 80 for further evaluation. Additionally, according to the present embodiment, the sorting device 50 sorts the areas within the photos according to their complexity value and sends to the user interface 30 the relevant information including, the relevant fragment and the recognition and analysis of the fragment received from the ORAS. Thus, the user interface 30 displays the relevant areas extracted from both photos and the difference recognized and analyzed by the ORAS.

The person skilled in the art will appreciate that what has been shown is not limited to the description above. Those skilled in the art to which this invention pertains will appreciate many modifications and other embodiments of the invention. It will be apparent that the present invention is not limited to the specific embodiments disclosed and those modifications and other embodiments are intended to be included within the scope of the invention. Although specific terms are employed herein, they are used in a generic and descriptive sense only and not for purposes of limitation. The invention, therefore, should not be restricted, except to the following claims and their equivalents.

What is claimed is:

1. A method for analysis of aerial photos, the method comprising:

receiving an aerial photo;

dividing the aerial photo to equal sized areas of two dimensional arrays of pixels;

calculating complexity values for the equal sized areas within the aerial photo received;

sorting the areas within the aerial photo in accordance with the complexity values;

displaying the aerial photo and analysis results of the complexity values; and wherein said complexity values give indication regarding the number of combinations of bit patterns appearing in the equal sized area relative to the number of possible combinations that could appear in the equal sized area.

2. The method of claim 1 further comprising comparing complexity values of at least two aerial photos of the same location taken at different times.

3. A system for analysis of aerial photos, the system comprises:

an input device for receiving aerial photos;

a computing device for dividing the aerial photo to equal sized areas of two dimensional arrays of pixels and calculating complexity values for the equal sized areas in the aerial photos;

a computing device for sorting complexity values of aerial photos; and a storage device for storing an internal database for storing the aerial photos; and wherein said complexity values give indication regarding the number of combinations of bit patterns appearing in the equal sized area relative to the number of possible combinations that could appear in the equal sized area.

4. The system of claim 3 further comprising a comparator device for comparing complexity values of at least two photos taken of the same location at different times.

* * * * *